Dec. 28, 1965     T. E. PATTON ETAL     3,226,468
MULTIPLE CONDUIT SPACING AND CLIPPING APPARATUS
Filed May 20, 1963
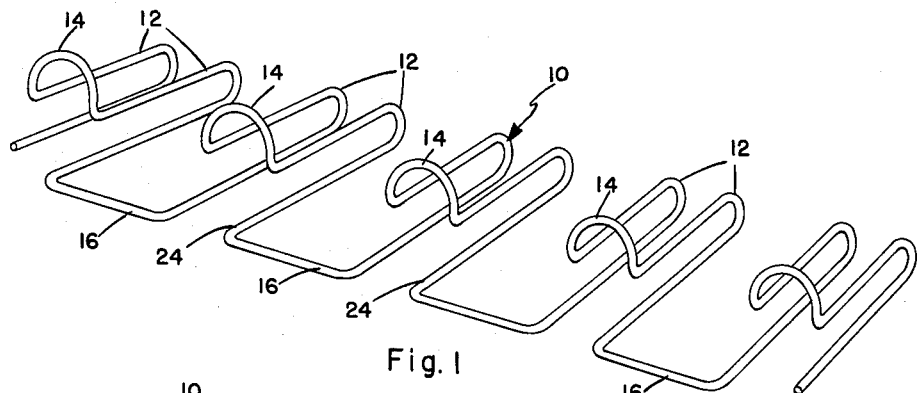
Fig. 1
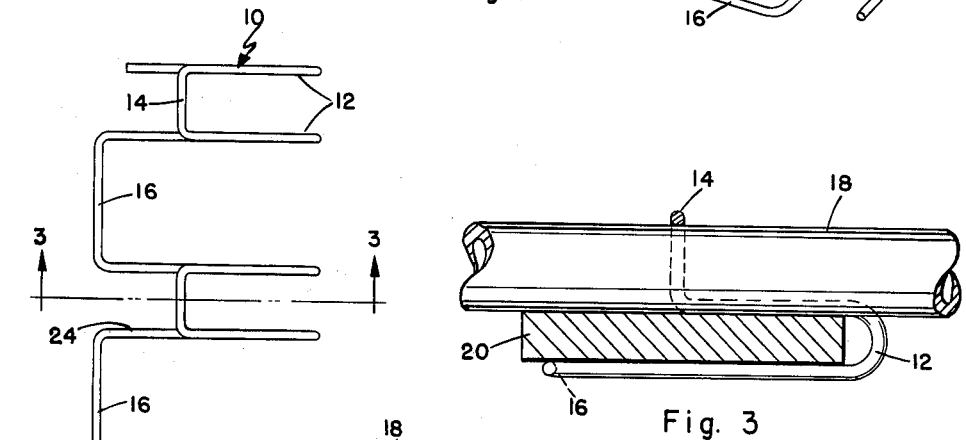
Fig. 3
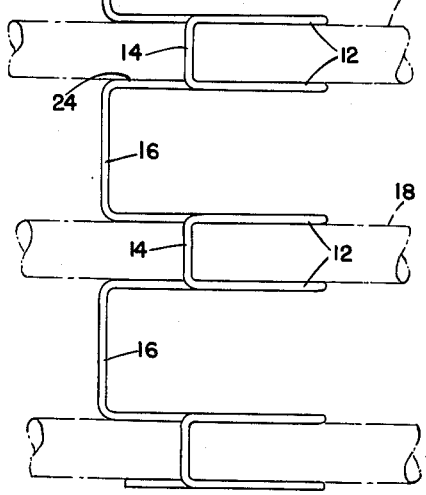
Fig. 2
Fig. 4
INVENTORS
TIMOTHY E. PATTON
PAUL A. CUSHMAN
BY
Knox & Knox

# United States Patent Office 3,226,468
Patented Dec. 28, 1965

3,226,468
MULTIPLE CONDUIT SPACING AND CLIPPING APPARATUS
Timothy E. Patton, 1190 Concord, El Cajon, Calif., and Paul A. Cushman, 6791 Alama Way, San Diego, Calif.
Filed May 20, 1963, Ser. No. 281,517
3 Claims. (Cl. 174—49)

This invention relates generally to conduit and wire clamps and particularly to means for exact spacing and rapid clipping of conduits and electrical conductors to structural supports in buildings and other structures.

Background

Utility service installations such as lighting, power, electrical control, telephone, heating, ventilation, and water in large industrial plants, commercial buildings, and the like, require miles of electrical wiring and conduits of various sizes and lengths distributed in a network with many branches. Except when laid in centrally located channels, the wires and conduits are secured at intervals to structural supports, such as beams and frames, by means of clamps, straps, and the like. The securing means vary in shape, size, and number according to the number and combination of different size wires and conduits, and usually are attached to the structural supports by screws or spot welding.

Manufacture and installation of the many different sizes and combinations of clamps in a large installation are costly and time consuming. Frequently, due to inadequate planning, work must be stopped until clamps with a particular configuration are manufactured. If the manufacturing process can be standardized and the installation technique simplified, a considerable saving in material and manhours will result.

Accordingly the instant invention is a multiple conduit and wire clipping unit that may be manufactured in standardized sizes, combinations, and lengths, thus reducing manufacturing costs. During installation, the standard unit may be cut to shorter lengths to include the number of clips needed for a particular combination. Also the unit may be installed without tools or other parts, one portion resiliently gripping a structural support, other portions properly spacing and resiliently gripping conduits and wires, thus reducing installation time and cost. Additionally, the unit includes means for bonding or insulating the various attached members as desired for a particular installation.

Objects

It is a principal object of this invention to provide apparatus for easy attachment of conduits and electrical conductors to structural supports, such as I-beams, frames, brackets, and the like.

It is another object of this invention to provide attachment apparatus that fits conduits and electrical conductors in combinations in which the sizes may be the same or different.

It is still another object of this invention to provide attachment apparatus by which the spacing between conduits and electrical conductors may be uniform or irregular.

It is yet another object of this invention to provide attachment apparatus that may be manufactured in standard sizes, combinations, and lengths; then cut to desired combinations and lengths.

It is a further object of this invention to provide attachment apparatus that bonds structural supports electrically to attached conducts.

It is still a further object of this invention to provide attachment apparatus that insulates structural supports and attached conduits and electrical conductors electrically from one another.

With these and other objects definitely in view, this invention consists in the novel combination and arrangement of elements as will be hereinafter fully described in the specification, particularly pointed out in the claims, and illustrated in the drawings that form a material part of this disclosure and in which:

FIGURE 1 is a perspective view of a multiple clip unit;

FIGURE 2 is a top plan view of a multiple clip unit showing conduits, electrical conductors, or the like held in place;

FIGURE 3 is an enlarged sectional view taken on line 3—3 of FIGURE 2, illustrating attachment to a structural support; and FIGURE 4 is a sectional view of an alternative, insulation covered clip structure.

Similar characters of reference indicate similar or identical elements and portions throughout the specification and throughout the views of the drawings.

Detailed description

In the drawing, multiple clip unit 10 comprises a number of U-shaped clips 12 joined by orthogonal, laterally disposed arcuate loops or yokes 14, each pair of clips 12 thus formed being joined by a connecting portion represented herein by a laterally disposed, straight portion 16. As illustrated in FIGURES 2 and 3, arcuate yokes 14 are designed for resiliently gripping conduits or electrical conductors 18, and U-shaped clips 12 are designed for resiliently gripping generally strap-like structural supports 20, such as beams, frames, brackets, and the like. During installation, conduits or electrical conductors 18 are inserted in yokes 14 and clips 12 are clipped onto structural support 20.

Multiple clip unit 10 is composed of resilient wire, such as spring steel or the like, so that slightly undersize clips 12 and yokes 14 will grip and hold snugly the structural supports and conduits or electrical conductors to which they are attached. Unit 10 includes a number of pairs of clips 12, each pair having an arcuate yoke 14, the entire unit being constructed from a single piece of wire. Consequently, multiple clip units may be manufactured in any convenient length; then cut, say at point 24, to include the number of yokes 14 desired for a particular combination of conduits and electrical conductors.

Yokes 14 may be produced in uniform or irregular sizes, and the spacing provided by the connecting portion 16 may be uniform or varied. Also the length and spacing of clips 12 may vary with structural support sizes. The spacing between adjacent yokes 14 may be designed to provide minimum clearance between adjacent conduits or electrical conductors for most economical use of space; may be increased to avoid inductive and capacitive coupling between adjacent electrical conductors; may be adjusted by careful bending of the connecting portions; or may be precisely adjusted to provide a 2-wire transmission line with desired characteristic impedance. The last mentioned arrangement constitutes a convenient way to install transmission lines interconnecting television antennas and receivers in apartment and other multiple unit buildings.

The wire used in fabricating the multiple clip units may be bare or covered with insulating material 22, such as rubber, plastic, varnish, and the like, as illustrated in FIGURE 4. Bare wire units are suitable for bonding metal conduits to metal structural supports, thus preventing electrolytic action and development of potential differences. Insulated wire units are suitable for insulating structural supports, conduits, and electrical conductors from one another, thus preventing electrolysis and electrical short circuits.

The multiple clip units may be attached to horizontal, vertical, or oblique structural supports in ceiling, floors, walls, elevator shafts, wiring terminal cabinets, and the like. The conduits may enclose electrical wiring or carry water, gas and other fluids.

It is understood that minor variation from the form of the invention disclosed herein may be made without departure from the spirit and scope of the invention, and that the specification and drawing are to be considered as merely illustrative rather than limiting.

We claim:

1. In combination, a strap-like structural support; a linear element of electrical conductor and conduit type; a plurality of clips, each clip having means resiliently engaging said structural support; means integral with the first mentioned means resiliently gripping said linear element; and connecting means interconnecting said clips, said connecting means being bendable to adjust the spacing between said clips, all said means being unitary and continuous in structure.

2. In combination, a strap-like structural support; a linear element of electrical conductor and conduit type; a plurality of pairs of laterally spaced U-shaped wire clips engaging a strap-like structural support, the legs of each clip being parallel and said clips being positioned in parallel planes; an arcuate wire yoke joining each pair of clips and dimensioned to engage and engaging said element, said wire yokes positioned in a plane generally normal to the plane of the legs of said clips; and a connecting wire portion joining adjacent clips of adjacent pairs, said clips, yokes and connecting portions being unitary and continuous.

3. Apparatus according to claim 2 in which adjacent yokes and the connecting portions have precisely adjusted dimensions presenting a desired characteristic impedance in a 2-wire transmission line secured in said loops.

References Cited by the Examiner

UNITED STATES PATENTS

| 995,741 | 6/1911 | Wadsworth | 211—181 X |
| 1,621,465 | 3/1927 | Hammes | 211—120 X |
| 2,216,876 | 10/1940 | Crum | 24—81 |
| 2,570,670 | 10/1951 | Harold | 24—11 |
| 3,004,095 | 10/1961 | Buzak | 174—51 |
| 3,036,801 | 5/1962 | Cemashko | 248—72 |
| 3,133,147 | 5/1964 | Auld et al. | 174—163 X |

JOHN F. BURNS, *Primary Examiner.*

JOHN P. WILDMAN, E. JAMES SAX, *Examiners.*